United States Patent [19]

Kohler

[11] Patent Number: 5,430,978
[45] Date of Patent: Jul. 11, 1995

[54] VACUUM HOSE STORAGE APPARATUS

[76] Inventor: Richard W. Kohler, 105 Polo Run, Waterloo, Ill. 62298

[21] Appl. No.: 318,533

[22] Filed: Oct. 5, 1994

Related U.S. Application Data

[63] Continuation of Ser. No. 134,180, Oct. 8, 1993, abandoned.

[51] Int. Cl.⁶ ............................................. E04F 19/00
[52] U.S. Cl. .......................................... 52/27; 248/75
[58] Field of Search ........................ 248/75, 79; 52/27;
137/355.16, 355.17, 357, 360

[56] References Cited

U.S. PATENT DOCUMENTS

| | | | |
|---|---|---|---|
| 2,177,128 | 10/1939 | Johnson | 248/75 X |
| 2,546,937 | 3/1951 | Wyandt et al. | 248/75 X |
| 3,939,862 | 2/1976 | Booth | 137/355.16 |
| 4,133,347 | 1/1979 | Mercer | 137/355.16 X |
| 4,223,702 | 9/1980 | Cook | 137/355.16 X |
| 4,474,415 | 10/1984 | Perri | 248/75 X |
| 4,708,532 | 11/1987 | Leppänen | 137/355.16 X |

Primary Examiner—Carl D. Friedman
Assistant Examiner—Creighton Smith
Attorney, Agent, or Firm—Polster, Lieder, Woodruff & Lucchesi

[57] ABSTRACT

An apparatus for the storage of a hose, such as a vacuum cleaner hose having a hollow elongated body mounted outside a closet or cabinet under the floor. A hollow access section cooperatively connected to the body extends up through the floor into the closet. The access section is mounted to a wall in the closet. The access section has a terminal orifice formed therein to allow the introduction of the hose into the access section and the body for storage. A protective gasket surrounds the orifice to protect the hose during introduction into the access section. In an alternative embodiment, the body is mounted above the ceiling and the access section extends down through the ceiling into the closet.

5 Claims, 2 Drawing Sheets

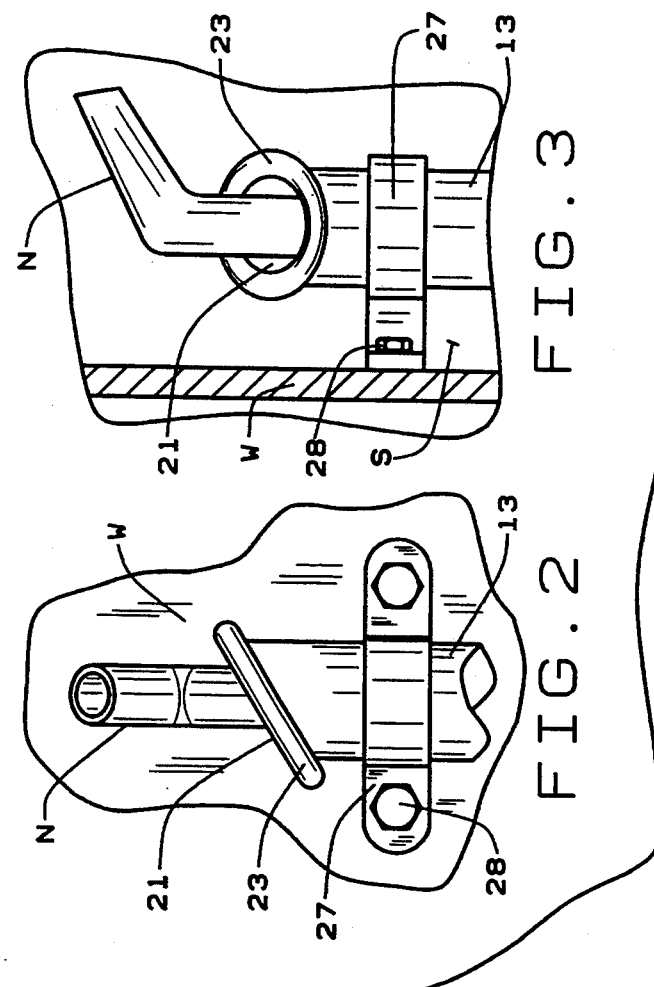
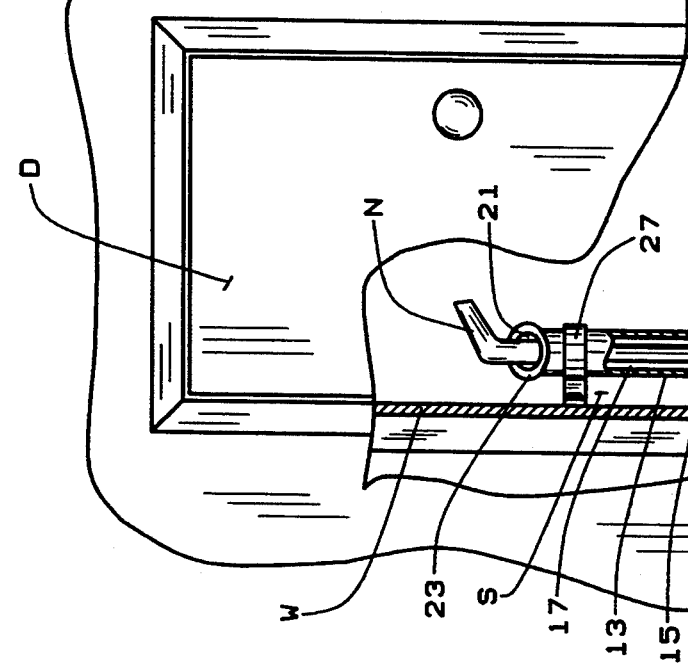

VACUUM HOSE STORAGE APPARATUS

This is a continuation application of application Ser. No. 08/134,180, filed on Oct. 8, 1993, now abandoned.

BACKGROUND OF THE INVENTION

This invention relates generally to vacuum cleaning systems, more particularly to an apparatus for the convenient storage of a length of vacuum cleaner hose when not in use.

Vacuum cleaners are well known to the art. One of the first power operated vacuum cleaners was devised by Hubert Cecil Brooks in 1901. A prototype machine was built in 1902 and it consisted of a powerful vacuum pump driven by a motor mounted on a four-wheel, horse-drawn van. The vacuum machine was parked outside a customer's house and the dust and dirt was sucked out of the house through a long hose into the vacuum cleaning machine.

The first portable electric vacuum cleaner for domestic use was marketed by Chapman & Skinner in San Francisco in 1905. The prototype of the modern portable vacuum system with a dust bag attached to a handle was built in 1907 by J. Murray Spangler. Spangler sold his rights in the device to W. H. Hoover and Hoover produced the first commercial model based on Spangler's design in 1908. Hoover's first commercial model was the prototype for generations of upright vacuum cleaners models.

Modern vacuum cleaners are of three general types. The traditional upright or vertical type which is light weight and moves across the surface to be cleaned. The upright model usually has a suction port to which a hose can be attached to facilitate the cleaning of furniture, draperies, and other objects apart from the flat surface of a floor. Cannister models, an alternative design, are generally more powerful than upright models. Cannister models are not moved across the surface but remain relatively stationary or moved in small increments across the floor on wheels or a cushion of air, while a long hose with a nozzle is moved to the area to be clean.

The third and most recent design of vacuum cleaners is the central vacuum system. In general, the central or built-in vacuum system is comprised of a fixed vacuum consisting of an electric motor capable of creating a powerful suction. The vacuum unit is mounted in the house or building, out of the way, generally in the garage, basement, utility room or the like. A network of hoses, mounted in the walls of the house, extends out from the central unit and terminate in the respective rooms of the house. Each room of a house, for example, will have an access outlet or receptacle. A portable hose, with a nozzle attached, can be carried from room to room and attached to the receptacle to provide access to the central vacuum unit. Generally, when the hose is attached to the receptacle, the central unit is activated to provide suction through the hose.

The central unit has several advantages over the upright and cannister modes. For example, the remote central unit is mounted out of sight. The unit can accommodate a more powerful motor than most portable models. The user merely carries the hose from room to room, inserts the hose into the receptacle, and vacuums the room.

There is one notable drawback to the central vacuum system. Since the user does not have a complete, mobile vacuum cleaner in the room, the central vacuum cleaner hose must necessarily be much longer than the conventional vacuum cleaner hose to reach from the receptacle to all corners of the room. A central system vacuum cleaner hose can be twenty-five (25) to thirty-five (35) feet long or more. Therefore storage of the hose, when not in use, creates a problem. It should be noted at this point that the storage of hoses used with conventional upright and cannister model vacuum cleaners presents similar problems and the present invention is applicable to those hoses as well.

To date, manufacturers and distributors of vacuum cleaning systems have not provided satisfactory storage systems or devices. One such device is a typical wall mounted hose rack consisting of a circular or semi-circular body. The hose is draped or wrapped in loops around the body. The rack must be mounted in a closet or on a utility room wall. The rack device is bulky, takes up closet space, and requires the hose to be maintained in a wound or looped condition for extended periods of time between uses. Frequent winding and unwinding can lead to premature wear and deterioration of the hose.

If the user does not have room or does not desire to mount a rack on the wall, he or she has few options for storing the hose. One manufacturer of central vacuum systems suggests that the user obtain a large basket and wind the hose into tight loops and store the hose in a basket in a closet or corner of a room. This is an unsatisfactory procedure for obvious reasons.

OBJECTS OF THE INVENTION

It is, therefore a principle object of the present invention to provide an apparatus for the storage of a length of hose that allows the hose to be stored in its extended position to avoid premature wear and deterioration.

It is another object of the present invention to provide an apparatus for the storage of a length of hose that can be installed between floor joists in a building so that the bulk of the hose is stored in unused or uninhabited space so as to preserve usable closet space for its intended purpose.

It is a further object of the present invention to provide an apparatus for the storage of a length of hose that can be installed among ceiling rafters.

It is another object of the present invention to provide an apparatus for the storage of a length of hose that can be mounted between the floor joists or ceiling rafters of a building having access in a closet or a cabinet to provide convenient yet hidden access to the apparatus.

It is a further object of the present invention to provide an apparatus for the storage of a length of hose that is simple and economical to manufacture, easy to install, and well suited for its intended purposes.

In accordance with the invention, generally stated, an apparatus for the storage of a length of hose is provided having an elongated hollow body with an inner diameter greater than the diameter hose to be stored therein, and an overall length long enough to accommodate the hose. The body is mounted axially between the floor joists of the building. A hollow access section cooperatively connected to the body extends up through the floor and is attached to a wall with a suitable bracket. The access section has an access orifice formed therein for the insertion of the length of hose. The access orifice is formed at an angle to facilitate access. A gasket, formed form suitable material, surrounds the access orifice to protect the hose during introduction and to the nozzle end of the hose. In an alternative embodiment of the invention the body is installed axially between the roof beams or rafters and the access section extends down through the ceiling.

BRIEF DESCRIPTION OF THE DRAWINGS

FIG. 1 a perspective view of the hose storage apparatus of the present invention mounted under a floor, the access section mounted in a closet;

FIG. 2 is a perspective view of the hose storage apparatus of the present invention mounted under a floor, the access section mounted in a kitchen cabinet;

FIG. 3 is a front plan view, partially in section, of the access section illustrating the mounting bracket and access orifice;

DESCRIPTION OF THE PREFERRED EMBODIMENT

Figure 4:
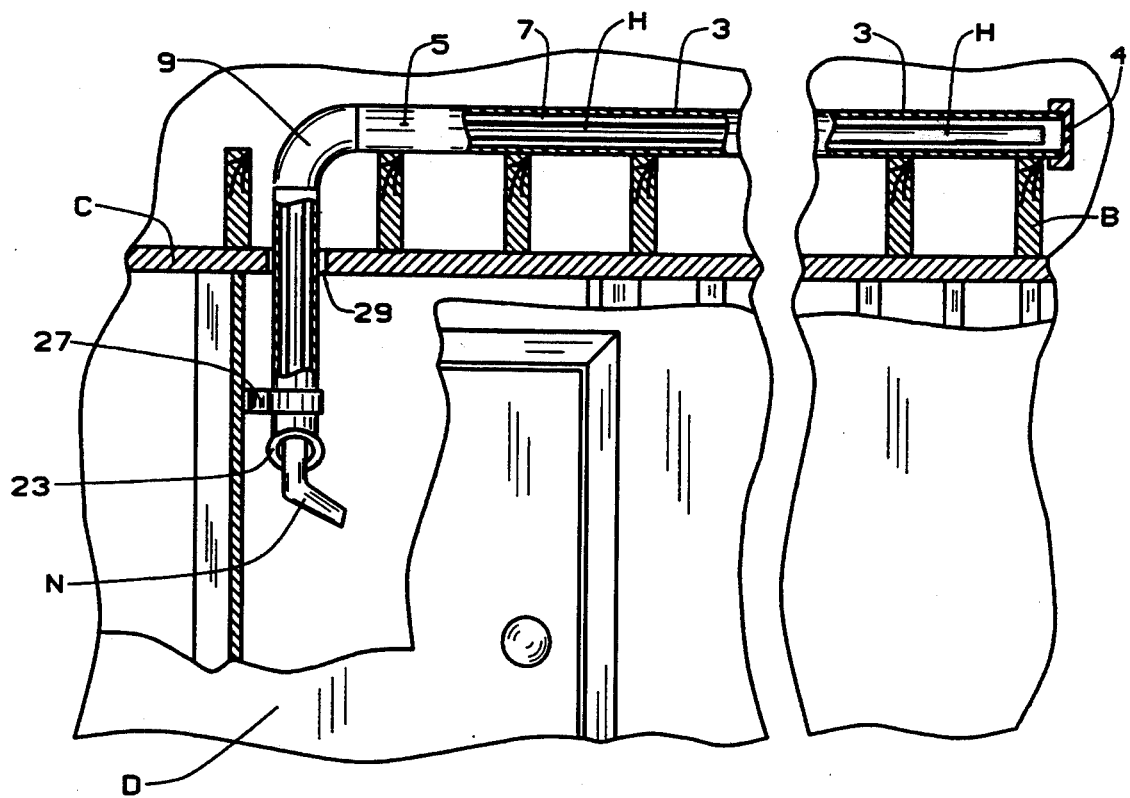
FIG. 4 is a side elevation, partially in section, of the access section.
Figure 5:
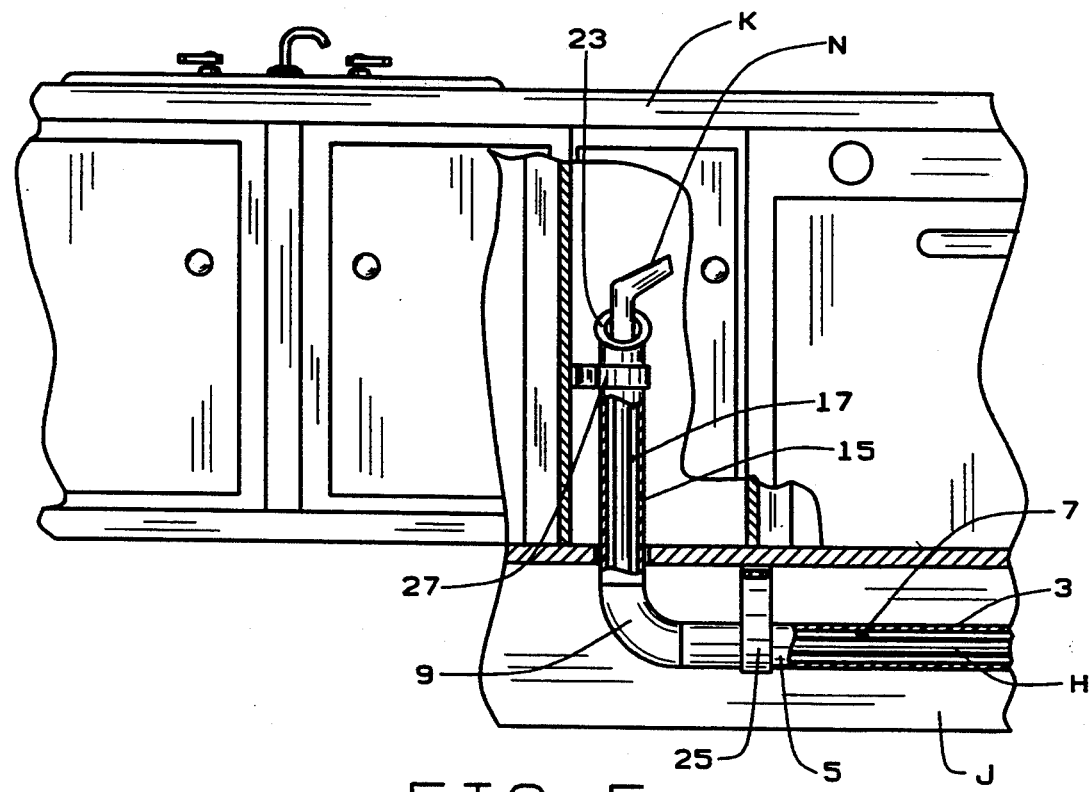
FIG. 5 is a perspective view of the hose storage apparatus of the present invention, partially in section, illustrating an alternative embodiment.

The apparatus for the convenient storage of a section of hose is indicated generally by reference numeral 1 in FIGS. 1 and 2. Apparatus 1 has a generally elongated body section 3, formed as a tube in the preferred embodiment, having an outer wall 5 defining and inner bore 7. Bore 7 has a diameter greater than the diameter of the hose H to be stored therein, i.e. generally greater than 1¾ inches (4.5 cm). The overall length of section 3 should be such to accommodate the length of hose H. Section 3 can be closed with a cap 4 or left open to accommodate a section of hose slightly longer than the apparatus.

An upwardly curved section 9 is attached to the forward end of body 3. Section 9 has an external wall 11 defining an internal bore (not shown) having the same general diameter as bore 7. It should be noted that section 9 can be a separate section of tubing appropriately attached to body 3 or it can be integrally formed from body 3. In any event section 9 is considered a portion of body 3.

Access section 13 is attached to section 9. Access section 13 has a wall 15 which defines bore 17. Bore 17 has an diameter which is also greater than the diameter of hose H. Access section 13 extends upward through floor F which is appropriately sealed, as at area 19, with a gasket (not shown) or other appropriate sealing means. Although section 13 is illustrated as a separate element, it may also be formed as a part of section 9 and body 3.

As best illustrated in FIGS. 3 and 4, section 15 terminates in a generally annular orifice 21 to allow insertion of hose H. A generally annular gasket 23 or other appropriate means surrounds orifice 21 to protect the hose during introduction through orifice 21 and to provide support and padding for nozzle N of hose H. The overall length of section 13 should be such as to place orifice 21 at a convenient height for use.

Although the apparatus illustrated in FIGS. 1 and 2 is shown constructed from PVC material, it should be noted that body 3, section 9 and section 13 may be constructed or formed of any appropriate material such as flexible plastic, rigid PVC, aluminum, metal, wood, stiff wire mesh, etc. Moreover those sections could be formed square or other appropriate configurations without departing from the scope of the invention.

As illustrated in FIGS. 1 and 2 a plurality of support brackets 25 are used to suspend body 3 from the bottom face of floor F. Body 3 runs parallel to an between floor joists, as shown by floor joist J. This arrangement allows the bulk of apparatus 1 to be confined out of the way in an uninhibited area of a building under floor F to conserve space and keep the bulk of hose H conveniently out of sight. Section 13 is attached to wall W of a closet with mounting bracket 27 (FIGS. 3 and 4) or secured with bolts 28, screws or other appropriate mounting means. The mounting means is designed so that section 13 is set off wall W, as shown by space S, to allow a hose bearing a nozzle or other attachment to rest in orifice 21. Door D can be closed to hide the exposed sections of the apparatus.

FIG. 2 shows apparatus 1 mounted within a small cabinet under a kitchen counter K. Apparatus 1, as shown in FIG. 2, contains the functional elements previously described.

FIG. 4 illustrates an alternative embodiment of apparatus 1. Body 3 is extended across ceiling rafters or roof beams B. Access section 13 extends down through ceiling C which is appropriately sealed, as at area 29. Section 13 terminates in orifice 21 surrounded by gasket 23 as previously described. Section 13 is secured to wall W with bracket 27, also as previously described. Since the overall length of body 3 can be as much as ten times the length of section 13, the bulk of hose H will be extended through section 3 thus holding hose H within the apparatus by weight and gravity. This arrangement of apparatus 1 allows the bulk of apparatus 1 to be confined to an uninhibited area of the building, above ceiling C, to conserve usable space and keep the bulk of hose H conveniently out of sight.

It should be noted that the device of the present invention could be employed totally in an inhabited or exposed area of a building if the user is not concerned with hiding the device from view. For example, the entire device could be exposed in a garage, basement, utility room or other room in the building.

As can be seen by the foregoing description various changes and modification could be made in the apparatus without departing from the scope of the appended claims. Therefore, the description and the accompanying drawings should be viewed as illustrative only and not in a limiting sense.

I claim:

1. In combination with a floor having floor joists, an apparatus for the storage of a length of hose under the floor comprising:
    an elongated body section positioned adjacent a joist under the floor, said body section having a tubular wall defining an internal bore, said bore having an inner diameter greater than an outer diameter of length of the hose, said body section disposed to hold the length of such hose;
    an upwardly curved tubular section connected to said body section;
    an access section having a tubular wall defining an internal bore connected to said upwardly curved section, said bore having an inner diameter greater than the outer diameter of the length of hose, said access section extending through the floor;
    an access opening formed in said access section to allow introduction of the length of hose into said body section and to allow removal of the length of hose from said body section.

2. The invention of claim 1 further comprising a protective means around said access opening to protect the length of hose during introduction into the body section.

3. In combination with a ceiling having rafters, a hose storage apparatus for the storage of a length of hose above the ceiling comprising:
 an elongated body section disposed adjacent at least one ceiling rafter, said body section having a tubular wall defining an internal bore;
 a downwardly disposed section having a tubular wall defining an internal bore, said downwardly directed section extending through the ceiling; and
 an access opening formed in said downwardly disposed section for the insertion and the withdrawal of the length of hose.

4. In combination with a floor of a building, an apparatus for the storage of a length of vacuum cleaner hose under a floor of a building comprising:
 a horizontal body section having a continuous tubular wall defining an internal bore, said wall having an inner diameter greater than an outer diameter of the length of vacuum cleaner hose, said horizontal body section positioned between floor joists under the floor;
 a plurality of brackets at said horizontal body section to attach said horizontal body section to the floor;
 a vertical access section having a first and a second end, said first end operatively connected to said horizontal body section, said second end extending through the floor, said vertical access section having a continuous tubular wall defining an internal bore in communication with said bore of said horizontal body section and defining an access orifice at said second end for insertion and removal of the length of vacuum cleaner hose; and
 a protective means around said access orifice to protect the length of vacuum cleaner hose during insertions and removal.

5. The invention of claim 4 wherein said horizontal body section and said vertical access section are formed from a rigid plastic material.

* * * * *